United States Patent
Tseng et al.

(10) Patent No.: US 7,198,399 B2
(45) Date of Patent: Apr. 3, 2007

(54) LAMP MODULE FOR PLANAR SOURCE DEVICE

(76) Inventors: Jen-Shou Tseng, No. 18, Wen-Shen St., Chunan Chen, Miao-Li Hsien (TW); Yin-Chun Huang, 6F, No. 72-11, Lane 531, Sec. 1, Kuang-Fu Rd., Hsinchu (TW)

( * ) Notice: Subject to any disclaimer, the term of this patent is extended or adjusted under 35 U.S.C. 154(b) by 0 days.

(21) Appl. No.: 11/406,129

(22) Filed: Apr. 17, 2006

(65) Prior Publication Data

US 2006/0187678 A1    Aug. 24, 2006

Related U.S. Application Data

(63) Continuation of application No. 10/605,922, filed on Nov. 6, 2003, now Pat. No. 7,059,758.

(30) Foreign Application Priority Data

Dec. 18, 2002   (TW)  .............................. 91220543 U

(51) Int. Cl.
*F21V 7/04* (2006.01)

(52) U.S. Cl. ...................................... 362/609; 362/216
(58) Field of Classification Search ........ 362/216–217, 362/608–609, 310
See application file for complete search history.

(56) References Cited

U.S. PATENT DOCUMENTS 4,562,517 A * 12/1985 Pankin ........................ 362/147
5,394,314 A *  2/1995 Evanisko ..................... 362/216

* cited by examiner

*Primary Examiner*—Ali Alavi
(74) *Attorney, Agent, or Firm*—Berkeley Law & Technology Group, LLP

(57) ABSTRACT

A lamp module comprising a lamp holder and a lamp is provided. The lamp holder has a structure with a curved arc surface such that the ends of the structure are inwardly converging. Light from the lamp impinging upon the curved arc surface is scattered out to a linear dimension greater than the original length of the lamp. The scattered light is projected onto the light-inlet surface of a light-guiding plate so that light emerges from the light-emitting surface as a planar light source.

11 Claims, 2 Drawing Sheets

LAMP MODULE FOR PLANAR SOURCE DEVICE

CROSS-REFERENCE TO RELATED APPLICATIONS

The present application is a continuation of U.S. application Ser. No. 10/605,922, filed Nov. 6, 2003, (now U.S. Pat. No. 7,059,758) titled "Lamp Module for Planar Source Device", assigned to the assignee of the presently claimed subject matter, and having common inventorship.

This application claims the priority benefit of Taiwan application serial no. 91220543, filed Dec. 18, 2002.

BACKGROUND OF INVENTION

1. Field of Invention

The present invention relates to an illumination system. More particularly, the present invention relates to the lamp holder of a lamp module that has a shorter lamp and a specified curvature radius.

2. Description of Related Art

Due to a rapid increase in processing speed and data storage capacity of computers, processing efficiency of graphic images has improved considerably. Image processing equipment such as optical scanners has an ever-increasing resolution and scanning speed. Flatbed scanner is one of the most common types of scanners in the market. A flatbed scanner has a scanning platform such as a transparent glass panel for putting a scan document or a pattern. To capture the image on the scan document or pattern, an optical scanning module underneath the glass panel moves in parallel to the platform surface. Flatbed scanners are quite popular nowadays because it has a relatively simple structure and easily expandable. Aside from scanning reflective documents or patterns, the flatbed scanner is also suitable for scanning transparent documents such as projection film. Obviously, there are scanners specially made for scanning transparent documents such as positive or negative films having a resolution greater than 2700 dpi. However, these scanners are generally expensive and uncommon.

FIG. 1 is a perspective view of a device for producing a planar light source in a conventional transparent scanner. In general, a planar light source device 100 is equipped with a light-guiding plate 110 and a lamp module 120. The lamp module 120 can be an externally attached module or built into the upper cover of the scanner. The lamp module 120 mainly consists of a lamp 122 and a lamp holder 124. The lamp 122 is, for example, a fluorescent tube for producing a line of light. The lamp 122 is positioned inside the lamp holder 124 and that the lamp 22 has a length identical to the lamp holder 124. The lamp holder 124 is a structure with a curve surface for reflecting light from the lamp 122 to the light-guiding plate 110. The lamp holder 124 has an overall length comparable to the width W of the light-guiding plate 110.

FIG. 2 is a perspective view of a planar light source device in another type of transparent scanner. As shown in FIG. 2, the lamp 122 and the lamp holder 124 are installed above the light-guiding plate 110. The lamp holder 124 has a length and width almost identical to the light-guiding plate 110. Similarly, the lamp holder 124 has a curvature structure. The only difference is that the lamp holder 124 covers a larger area. Due to a larger volume of occupation, the lamp holder 124 is less convenient to use.

In the aforementioned lamp module, light is projected from a lamp onto a surface after reflecting from the lamp holder and passing through the light-guiding plate. This type of lamp module has some disadvantages with regard to weight and cost of production. The lamp must have a length identical to the length of the lamp holder and that the lamp holder must match the length and width of the light-guiding plate. Consequently, not only is the weight of the lamp module increased, but material cost of the lamp module is increased as well.

SUMMARY OF INVENTION

Accordingly, one object of the present invention is to provide a lamp module can be used, for example, for a scanner that can use a shorter lamp inside a lamp holder. The lamp holder has a curved arc surface capable of dispersing light from the lamp so that a shorter lamp can be used and hence overall weight of the lamp holder can be reduced. Actually, the back light source of the invention is not limited to be used in scanner.

A second object of this invention is to provide a planar light source device for a scanner. By combining a shorter lamp with a lamp holder to form a lamp module and dispersing light from the lamp inside the lamp module to a light-guiding plate, a planar light source is produced.

To achieve these and other advantages and in accordance with the purpose of the invention, as embodied and broadly described herein, the invention provides a lamp module. The lamp module mainly comprises of a lamp holder and a lamp. The lamp holder has a curved arc surface with the ends of the curved arc surface inwardly converging. The lamp is embedded inside the curved arc structure and that light from the lamp is dispersed to a linear dimension greater than the length of the lamp after reflecting from the curved arc structure.

This invention also provides a planar light source device constructed from a lamp holder, a lamp and a light-guiding plate. The lamp holder has a curved arc surface with the ends inwardly converging. The lamp is embedded within the curved arc structure and that light from the lamp is dispersed to a linear dimension greater than the length of the lamp after reflecting from the curved arc structure. The light-guiding plate and the lamp holder are connected. The light-guiding plate has a light-inlet surface ad a light-emitting surface. The light-inlet surface faces the lamp and the lamp holder. A line of light from the lamp entering the light-inlet surface will be deflected out via the light-emitting surface to form a planar light source.

According to one embodiment of this invention, the curved arc surface can have a fixed radius of curvature or a variable radius of curvature, that is, radius of curvature of the lamp holder may vary according to position. In addition, length of the lamp holder can be smaller than the light-inlet surface and hence reducing overall weight and volume of the lamp holder even further.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
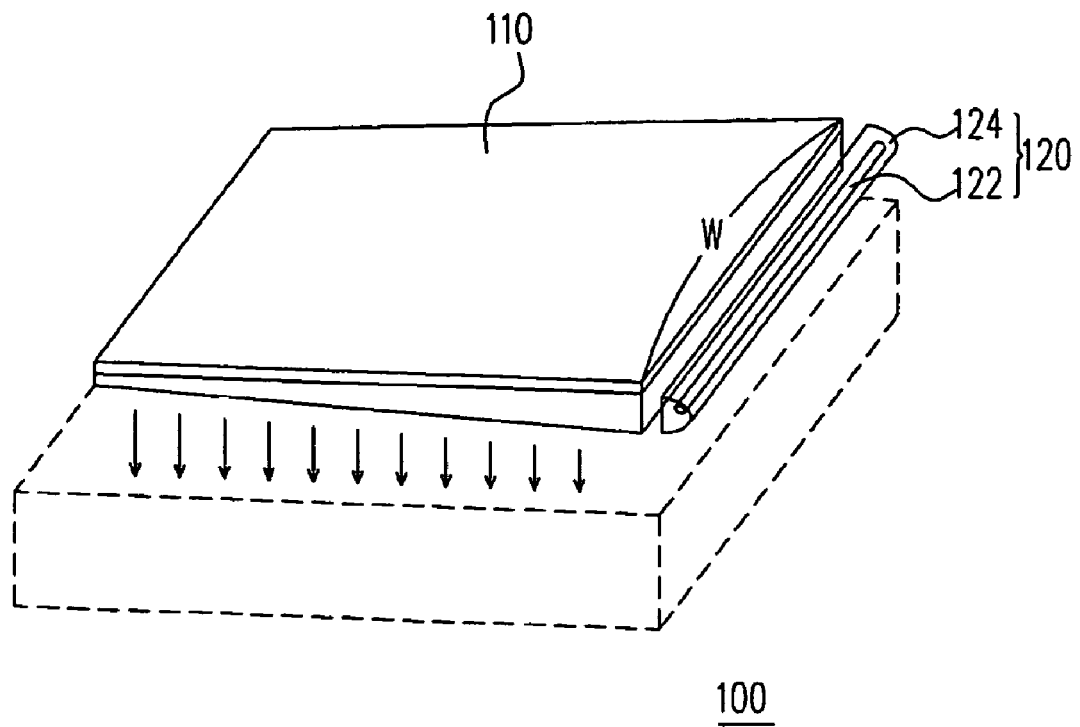
FIG. 1 is a perspective view of a device for producing a planar light source in a conventional transparent scanner.
Figure 2:
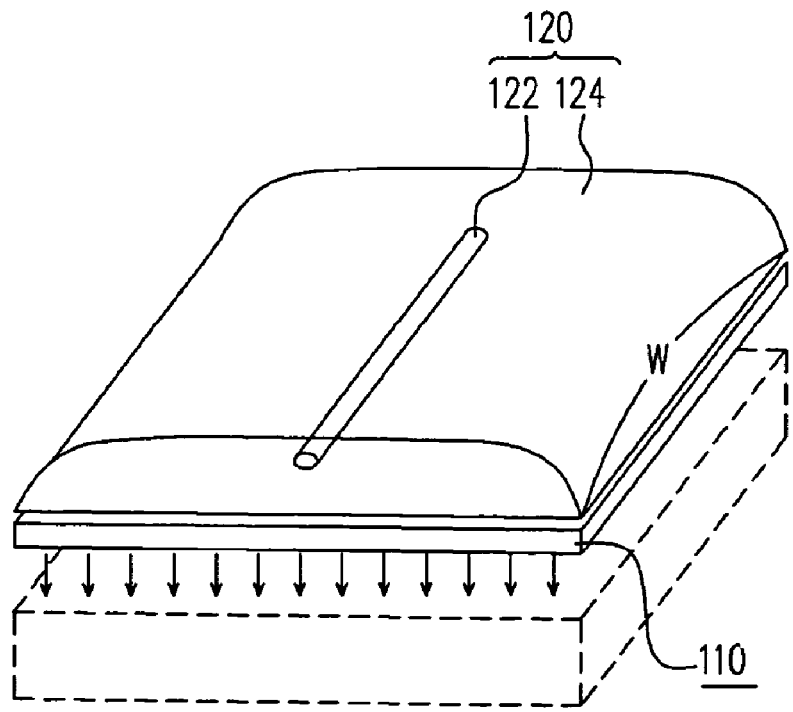
FIG. 2 is a perspective view of a planar light source device in another type of transparent scanner.

Reference will now be made in detail to the present preferred embodiments of the invention, examples of which are illustrated in the accompanying drawings. Wherever possible, the same reference numbers are used in the drawings and the description to refer to the same or like parts.

Because a light-guiding plate is an ideal device for producing uniform light intensity across an area, light-guiding plates are adopted in most large area developing and illumination systems to produce a planar light source. The following is a more detailed description of the function of the light-guiding plate.

Figure 3:
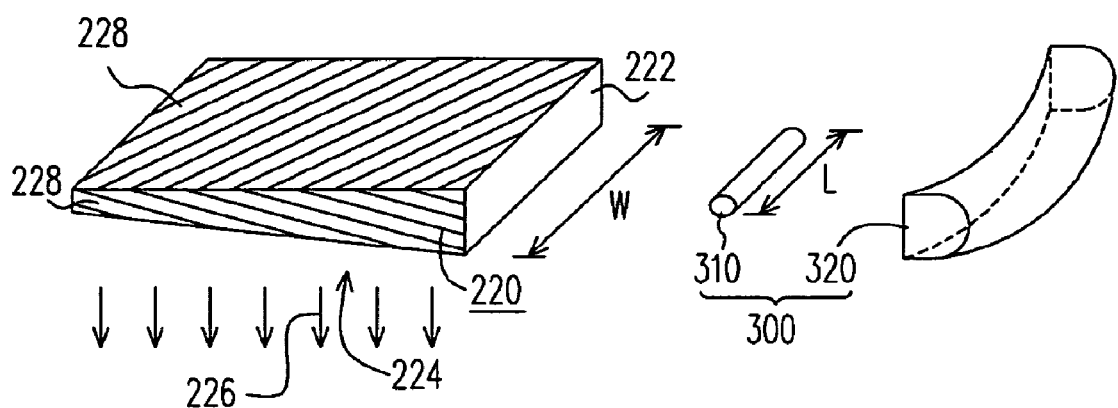
FIG. 3 is a perspective view of all the disembodied components constituting a planar light source device according to one preferred embodiment of this invention.

FIG. 3 is a perspective view of all the disembodied components constituting a planar light source device according to one preferred embodiment of this invention. As shown in FIG. 3, the light-guiding plate 220 has a light-inlet surface 222 and a light-emitting surface 224. The light-inlet surface 222 mainly receives incoming light. The light-emitting surface 224 is, for example, a slant surface such that the light-guiding plate 220 has a varying thickness. Light entering the light-inlet surface 222 will be guided to different positions on the light-emitting surface, which has a slightly different thickness. After refraction through the light-emitting surface 224, a planar light source 226 consisting of parallel beams emerges. Furthermore, to enhance the light-collecting capacity of the light-guiding plate 220, a plurality of reflecting surfaces 228 may be added to surface outside the light-inlet surface 222 and the light-emitting surface 224 for reducing leakage.

In this embodiment, the lamp provides a transparent document with a planar light source through the light-guiding panel. Hence, the lamp module 300 together with the light-guiding plate 220 constitute a planar light source device that improves upon the overall length of the lamp and the lamp holder. The lamp module 300 mainly comprises of a lamp 310 and a lamp holder 320. Note that length L of the lamp 310 is smaller than the width the lamp holder 320. In other words, length L of the lamp 310 is smaller than the width W of the light-inlet surface 222 of the light-guiding plate 220. Furthermore, the lamp holder 320 has a curved arc surface with the ends converge towards the lamp 310. One major difference of this invention from a conventional design is that some of the light from the lamp may be reflected to the sides of the lamp through the curved arc structure in the lamp holder. Hence, a beam of dispersed light having a linear dimension greater than the length of the lamp is produced.

Figure 4:
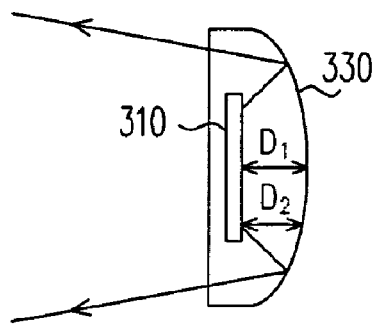
FIG. 4 is a top view of a lamp module according to one preferred embodiment of this invention.

FIG. 4 is a top view of a lamp module according to one preferred embodiment of this invention. As shown in FIG. 4, the lamp holder 330 has a curved arc surface. Typically, the lamp holder 330 and the contact surface of the light-guiding panel (not shown) are tightly engaged to prevent the dispersion of light. In addition, the distance D1 from the central area of the lamp 310 to the lamp holder 330 is greater than the distance D2 from the ends of the lamp 310 to the lamp holder 330. Obviously, length of the lamp holder can be reduced through an increase in the curvature near the ends so that light from the lamp is able to spread out over the entire light-inlet surface. In other words, light is projected over the entire light-inlet surface without causing any loss in lamp module function.

Figure 5:
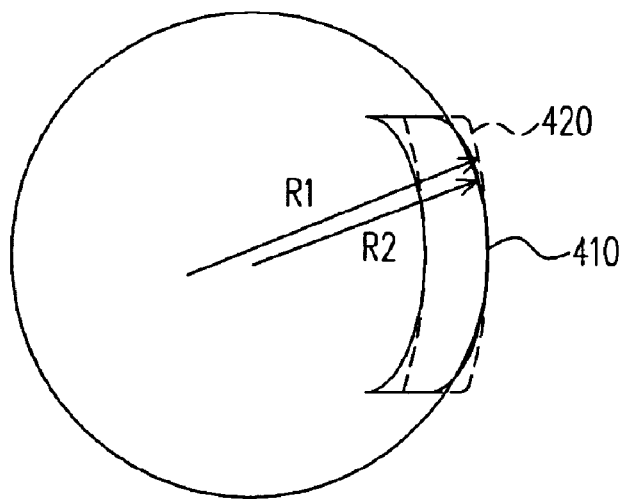
FIG. 5 is a schematic diagram showing the curvature of the curved arc surface of the lamp holder according to this invention.

FIG. 5 is a schematic diagram showing the curvature of the curved arc surface of the lamp holder according to this invention. As shown in FIG. 5, the lamp holder 410 may have a curved arc surface with fixed radius of curvature (shown in solid line). In fact, the curved arc surface is an arc of a circle with a radius R1. However, the lamp holder 420 may also have a curved arc surface with a variable radius of curvature (shown in dash line) such that the radius of curvature varies from R1 to R2 along the curved arc surface. Curvature of the lamp holder may change according to position and adjust the reflecting angle so that the light inlet surface of the light-guiding plate is able to receive light of uniform intensity.

In summary, major advantages of the lamp module according to this invention includes: 1. The lamp module uses a shorter lamp inside a lamp holder to produce a scattered light source. Ultimately, weight of the lamp module can be reduced and some material cost can be save. Together with a light-guiding plate, a planar light source device is produced. 2. The lamp module utilizes a curved arc surface in the lamp holder to reduce overall length of the lamp. Moreover, the lamp holder may have a variable curvature to adjust the reflecting angle and produce a planar light source with highly uniform intensity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An apparatus, comprising:
a lamp holder having a curved arc surface, wherein ends of the curved arc surface are at least partially inwardly converging, and wherein the lamp holder is adapted to hold a lamp having a length shorter than a length of the lamp holder and reflect light provided by the lamp over a linear dimension larger than the length of the lamp; and
a light-guiding plate coupled to the lamp holder, comprising:
a light inlet surface; and
a light outlet surface,
wherein the light-guiding plate comprises at least a top reflective surface coupled to a plurality of side reflective surfaces, wherein the top reflective surface is configured at a slope with respect to light outlet surface, and the plurality of side reflective surfaces have a length and a height, wherein the height of one or more of said reflective surfaces varies along the length, and wherein the light guiding plate is adapted to:
receive non-planar light at the light inlet surface; and
enable the non-planar light entering the light inlet surface and reaching the light emitting surface to emerge as a planar light source.

2. The apparatus of claim 1, wherein the top reflective surface and the side reflective surfaces are configured such that a substantial portion of the light entering the light inlet surface is reflected to emerge as the planar light source.

3. The lamp module of claim 1, wherein the lamp includes a fluorescent tube.

4. The lamp module of claim 1, wherein the curved arc surface has an at least partially fixed radius of curvature.

5. The lamp module of claim 1, wherein the curved arc surface has an at least partially variable radius of curvature.

6. A scanner light source, comprising:
   means for producing non-planar light;
   means for receiving the non-planar light at a light-guiding plate; and
   means for reflecting the received non-planar light to enable emitting the non-planar light as planar light from a light outlet surface of the light-guiding plate.

7. The scanner light source of claim 6, further comprising:
   means for reflecting the received non-planar light to a plurality of reflective surfaces of the light-guiding plate to further enable emitting the non-planar light as planar light from a light outlet surface of the light-guiding plate.

8. The scanner light source of claim 6, wherein the means for producing non-planar light comprises:
   a lamp holder having a curved arc surface, wherein the ends of the curved arc surface are at least partially inwardly converging, wherein the lamp holder comprises a length; and
   a lamp disposed on the lamp holder, wherein the lamp has a length shorter than the length of the lamp holder, and wherein the structure is capable of reflecting light over a linear dimension larger than the length of the lamp.

9. The scanner light source of claim 8, wherein the lamp includes a fluorescent tube.

10. The scanner light source of claim 8, wherein the curved arc surface has an at least partially fixed radius of curvature.

11. The scanner light source of claim 8, wherein the curved arc surface has an at least partially variable radius of curvature.

* * * * *